United States Patent Office 2,832,807
Patented Apr. 29, 1958

2,832,807
METHOD OF PRODUCING DIVINYL ETHER

Rudolf Mittag, Munich, and Jürgen Smidt, Munich-Solln, Germany, assignors to Consortium für Elektrochemische Industrie G. m. b. H., Munich, Germany, a corporation of Germany No Drawing. Application June 30, 1954
Serial No. 440,554

Claims priority, application Germany July 29, 1953

2 Claims. (Cl. 260—614)

The object of the present invention is the production of divinyl ether from $\alpha,\alpha'$-dichlorodiethyl ether by thermally splitting off hydrochloric acid in accordance with the following reaction equation:

$$(CH_3-CHCl)_2O \rightarrow (CH_2=CH)_2+2HCl$$

According to the invention, $\alpha,\alpha'$-dichlorodiethyl ether vapors are conducted over a heated surface, preferably at a temperature of 600° C. to 800° C., and, if desired in the presence of a catalyst such as barium chloride. Suitable surfaces are such as are used in the usual conversion receptacles, for instance tubes, conduits, and the like, made of metal, glass, quartz, porcelain, or the like, or lined with such materials. In order to increase the effectiveness of the surfaces, the conversion receptacles may contain filler members. The most suitable temperature for performing the reaction will vary within a wide range according to the velocity of the gases conducted through the conversion receptacles, the configuration and construction of the receptacles, the type of catalyst used, etc. Often it may be of advantage to carry out the splitting in the presence of inert gases, such as nitrogen, hydrogen, carbon dioxide, or the like, and the splitting operation may also be carried out at subatmospheric pressures. The splitting process according to the present invention affords a high conversion rate, only few byproducts being formed. This is surprising in view of the fact that $\alpha,\alpha'$-dichlorodiethyl ether is comparatively sensitive and unstable so that under otherwise mild splitting conditions it breaks up almost exclusively into carbon oxide, methane, ethylene, etc., without forming appreciable quantities of divinyl ether.

Pure divinyl ether may conveniently be obtained in accordance with the present invention by fractionally condensing the gases issuing from the conversion receptacle, washing the crude divinyl ether with alkalis, drying and finally subjecting it to a fractional distillation. If inert gases are employed in the splitting process, it is advisable to absorb the conversion products in a solvent and to extract them from the solvent by fractional distillation, in known manner. The divinyl ether thus obtained may be used in the manufacture of synthetic substances.

The method according to the invention is very economical also due to the fact that the split-off hydrochloric acid may be reconverted into $\alpha,\alpha'$-dichlorodiethyl ether with the aid of acetaldehyde, so that for the production of the dichlorodiethyl ether practically only acetaldehyde is required. The reconversion may without difficulty be continuously coupled with the splitting process according to the invention, whereby the economic aspect of the process is still further enhanced.

Example 186 grams of $\alpha,\alpha'$-dichlorodiethyl ether vapor with 900 liters nitrogen are conducted through a quartz tube heated to 700° C. at a velocity of 3 meters per second for one hour. The reaction products are absorbed in cooled toluene and separated by distillation. Apart from nonconverted dichlorodiethyl ether, 68 grams of pure divinyl ether is obtained, corresponding to 75% of the theoretical amount, and the equivalent quantity of hydrochloric acid.

What is claimed is:

1. Process for producing divinyl ether which comprises pyrolyzing $\alpha,\alpha'$-dichlorodiethyl ether, in water-free gaseous phase and at a temperature within the range of 600° C. to 800° C., and recovering divinyl ether from the gaseous mixture.

2. Process as defined in claim 1 wherein the pyrolysis takes place by passing the vapors of said ether over a barium chloride catalyst.

References Cited in the file of this patent

UNITED STATES PATENTS 2,564,035 Seon et al. _____ Aug. 14, 1951
2,725,411 Ladd et al. _____ Nov. 29, 1955

OTHER REFERENCES

Hibbert et al.: Jour. Amer. Chem. Soc., vol. 51 (1929), pp. 1551–5.

Hall et al.: Jour. Org. Chem., vol. 15 (1950), pp. 715–19.

Merck Index 6th Ed. (1952), p. 374, publ. by Merck & Co., Rahway, New Jersey.